(12) United States Patent
Aoyagi et al.

(10) Patent No.: US 9,137,722 B2
(45) Date of Patent: Sep. 15, 2015

(54) BASE STATION AND SYSTEM INFORMATION NOTIFICATION METHOD

(75) Inventors: Kenichiro Aoyagi, Chiyoda-ku (JP);
Mikio Iwamura, Chiyoda-ku (JP);
Kazunori Obata, Chiyoda-ku (JP);
Tadashi Uchiyama, Chiyoda-ku (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 14/233,393

(22) PCT Filed: Jul. 4, 2012

(86) PCT No.: PCT/JP2012/067134
§ 371 (c)(1),
(2), (4) Date: Jan. 17, 2014

(87) PCT Pub. No.: WO2013/021757
PCT Pub. Date: Feb. 14, 2013

(65) Prior Publication Data
US 2014/0148168 A1 May 29, 2014

(30) Foreign Application Priority Data
Aug. 11, 2011 (JP) .................. 2011-176241

(51) Int. Cl.
*H04W 36/16* (2009.01)
*H04W 48/12* (2009.01)
(Continued)

(52) U.S. Cl.
CPC ............ *H04W 36/165* (2013.01); *H04W 48/02* (2013.01); *H04W 48/12* (2013.01); *H04W 52/0216* (2013.01); *H04W 52/0219* (2013.01); *H04W 68/02* (2013.01)

(58) Field of Classification Search
CPC ..... H04W 24/04; H04W 24/02; H04W 48/02; H04W 48/20; H04W 36/165; H04W 48/06; H04W 48/16; H04W 48/08; H04W 48/10
USPC .................. 455/453, 458, 436, 438
See application file for complete search history.

(56) References Cited

U.S. PATENT DOCUMENTS

| 2010/0113045 A1 | 5/2010 | Iwamura et al. |
| 2011/0021215 A1 | 1/2011 | Iwamura et al. |
| 2011/0143712 A1* | 6/2011 | Christensson et al. ........ 455/410 |

FOREIGN PATENT DOCUMENTS

| EP | 2 252 107 A2 | 11/2010 |
| JP | 2008 236559 | 10/2008 |

(Continued)

OTHER PUBLICATIONS

3GPP TS 36.304 V8.9.0 (Sep. 2010) p. 17-25.
(Continued)

*Primary Examiner* — Nam Huynh
(74) *Attorney, Agent, or Firm* — Oblon, McClelland, Maier & Neustadt, L.L.P.

(57) ABSTRACT

A base station includes a system information creating unit that creates first system information for barring communication and second system information for not barring; a timing determination unit that classifies user equipment into groups based on timings of the user equipment being in an idle mode to be activated in every discontinuous reception period, and that determines, for each of the groups, a timing of transmitting a paging signal; and a transmitter that transmits the paging signal to the user equipment of some of the groups, and subsequently the first system information; that switches transmission of the first and second system information, so that a ratio between a number of transmitting the first system information and that of the second system information corresponds to a barring ratio; and that transmits the paging signal to the user equipment of the some of the groups, and subsequently the second system information.

5 Claims, 10 Drawing Sheets

(51) Int. Cl.
  *H04W 52/02* (2009.01)
  *H04W 48/02* (2009.01)
  *H04W 68/02* (2009.01)

(56) References Cited

FOREIGN PATENT DOCUMENTS

| JP | 2009 035060 | 3/2009 |
| JP | 2009 077289 | 4/2009 |
| JP | 2009 206860 | 9/2009 |
| JP | 2010 232811 | 10/2010 |

OTHER PUBLICATIONS

International Search Report Issued Jul. 31, 2012 in PCT/JP12/67134 Filed Jul. 4, 2012.
Extended European Search Report issued Apr. 24, 2015 in Patent Application No. 12821888.0.

* cited by examiner

FIG.7

| TIME | SYSTEM INFORMATION REGULATION (%) | G1 | G2 | G3 | G4 | G5 |
|---|---|---|---|---|---|---|
| | | [BARRING] | | | | |
| $T_{5N-1}$ | | PAGING | | | | |
| $T_0$ | 0 | RELEASE BARRING | PAGING | | | |
| $T_1$ | 100 | | START BARRING | | | |
| ⋮ | ⋮ | | [BARRING] | | | |
| $T_{N-1}$ | | | PAGING | | | |
| $T_N$ | 0 | | RELEASE BARRING | PAGING | | |
| $T_{N+1}$ | 100 | | | START BARRING | | |
| ⋮ | ⋮ | | | [BARRING] | | |
| $T_{2N-1}$ | | | | PAGING | | |
| $T_{2N}$ | 0 | | | RELEASE BARRING | PAGING | |
| $T_{2N+1}$ | 100 | | | | START BARRING | |
| ⋮ | ⋮ | | | | [BARRING] | |
| $T_{3N-1}$ | | | | | PAGING | |
| $T_{3N}$ | 0 | | | | RELEASE BARRING | PAGING |
| $T_{3N+1}$ | 100 | | | | | START BARRING |
| ⋮ | ⋮ | | | | | [BARRING] |
| $T_{4N-1}$ | | | | | | PAGING |
| $T_{4N}$ | 0 | PAGING | | | | RELEASE BARRING |
| $T_{4N+1}$ | 100 | START BARRING | | | | |
| ⋮ | ⋮ | [BARRING] | | | | |

FIG.8

| TIME | SYSTEM INFORMATION REGULATION (%) | G1 | G2 | G3 |
|---|---|---|---|---|
| ⋮ | ⋮ | PAGING | | |
| $T_0$ | 0 | RELEASE BARRING | PAGING | |
| $T_1$ | 100 | | START BARRING | |
| $T_2$ | 0 | | | |
| $T_3$ | 0 | | | |
| $T_4$ | 0 | | | |
| $T_5$ | 0 | | | |
| $T_6$ | 100 | | | |
| $T_7$ | 0 | | | |
| $T_8$ | 0 | | | |
| $T_9$ | 0 | | [BARRING] | |
| $T_{10}$ | 0 | | | |
| $T_{11}$ | 100 | | | |
| $T_{12}$ | 0 | | | |
| $T_{13}$ | 0 | | | |
| $T_{14}$ | 0 | | | |
| $T_{15}$ | 0 | | | |
| $T_{16}$ | 100 | | | |
| $T_{17}$ | 0 | | | |
| $T_{18}$ | 0 | | | |
| $T_{19}$ | 0 | | PAGING | |
| $T_{20}$ | 0 | | RELEASE BARRING | PAGING |
| | 100 | | | START BARRING |
| ⋮ | ⋮ | | | |

FIG.10

| TIME | SYSTEM INFORMATION REGULATION (%) | G1 | G2 | G3 | G4 | G5 |
|---|---|---|---|---|---|---|
| $T_0$ | 0 | RELEASE BARRING | PAGING | | | |
| $T_1$ | 100 | | START BARRING | | | |
| $T_2$ | 0 | | | | | |
| $T_3$ | 0 | | [BARRING] | | | |
| $T_4$ | 0 | | PAGING | | | |
| $T_5$ | 0 | | RELEASE BARRING | PAGING | | |
| $T_6$ | 100 | | | START BARRING | | |
| $T_7$ | 0 | | | | | |
| $T_8$ | 0 | | | [BARRING] | | |
| $T_9$ | 0 | | | PAGING | | |
| $T_{10}$ | 0 | | | RELEASE BARRING | PAGING | |
| $T_{11}$ | 100 | | | | START BARRING | |
| $T_{12}$ | 0 | | | | | |
| $T_{13}$ | 0 | | | | [BARRING] | |
| $T_{14}$ | 0 | | | | PAGING | |
| $T_{15}$ | 0 | | | | RELEASE BARRING | PAGING |
| $T_{16}$ | 100 | | | | | START BARRING |
| $T_{17}$ | 0 | | | | | |
| $T_{18}$ | 0 | | | | | [BARRING] |
| $T_{19}$ | 0 | | | | | PAGING |
| $T_{20}$ | 0 | PAGING | | | | RELEASE BARRING |
| $T_{21}$ | 100 | START BARRING | | | | |

BASE STATION AND SYSTEM INFORMATION NOTIFICATION METHOD

TECHNICAL FIELD

The present invention relates to a base station and a system information notification method.

BACKGROUND ART

When congestion occurs in a cell of a mobile communication system or in a communication network apparatus, a base station can avoid a congestion state, for example, by barring user equipment being in an idle mode from accessing the base station, and transferring the user equipment to another cell. The user equipment camping on a cell can be transferred to another cell by using system information which is included in broadcast information transmitted from a base station. For example, the system information may include state information indicating a state of the cell, and the state information may indicate whether the cell is congested. In general, the system information includes an information element which is required for user equipment to properly operate in a cell. For a case of a mobile communication system, such as an LTE system, an information element "cellBarred IE" may be used as the state information indicating the state of the cell. When congestion does not occur, the information element takes a value of "notBarred." When the congestion occurs, the information element takes a value of "Barred." In this manner, by broadcasting, as the system information, the state information indicating whether the congestion occurs, the user equipment can determine whether it is barred. Non-Patent Document 1 discloses such a technique.
Related Art Document
[Non-Patent Document]
Non-Patent Document 1: 3GPP TS36.304 V8.9.0(2010-09), 5.2.4, and 5.3

SUMMARY OF THE INVENTION

Problem to be Solved by the Invention

In a cell, there exist units of user equipment in an idle mode and units of user equipment which are newly transferred to the cell as well as units of user equipment in an active mode, which are transmitting user traffic. Among these, usually, the units of the user equipment and the units of the user equipment which are newly transferred to the cell are the subject of barring. When user equipment being in the idle mode receives system information (broadcast information) indicating that the cell is barred, the user equipment determines that access to the cell is barred, and attempts to transfer to another cell, if necessary. When user equipment attempting to newly enter the cell receives the system information (the broadcast information) indicating that the cell is barred, the user equipment determines that access to the cell is barred, and attempts to transfer to another cell, if necessary. The transfer to another cell may be performed by cell reselection, or by redirection. In general, cell reselection is a technique to switch the cell while maintaining the idle mode. Redirection is a technique to switch the cell by receiving, from a network, a control command for temporarily releasing connection with a serving cell, and by selecting a cell in accordance with an instruction of the control command.

The system information is received by all the units of the user equipment being served by the cell. Accordingly, when the system information is received, which indicates that the cell is barred, a significant number of the units of the user equipment (which are the units of the user equipment being in the idle mode) receiving it simultaneously attempt to transfer to another cell. For example, along with moving of a train, many units of user equipment attempt to transfer from the cell to another cell. As a consequence, it is possible that the transfer target cell is suddenly congested. Especially, congestion tends to occur when they transfer to another cell, in which a different radio access technology (RAT) is implemented. That is because, when the user equipment transfers to the cell, in which the different radio access technology (RAT) is implemented, the user equipment may be required to perform an attach process, or a location registration process, for example. If a significant number of such a process simultaneously occurs, the transfer target cell may be congested. Even if the transfer target cell has a sufficient capacity from a perspective of a total number of the users to be accommodated, if a transfer target base station does not have a sufficient capability to quickly process the attach processes; the location registration processes; and the like, which occur simultaneously, the transfer target cell may be congested. In order to avoid such congestion, in the transfer target cell, the base station may broadcast system information, which indicates that barring is performed. In this case, the user equipment is completely prevented from entering the transfer target cell. Namely, even if the transfer target cell has a sufficient capacity from the perspective of the total number of the users to be accommodated, if signal processing for the attach process; the location registration process; and the like may not be quickly performed, the cell may be barred, and the user equipment may be completely rejected from entering. In this manner, in a system according to related art, barring for avoiding the congestion may unnecessarily prevent the user equipment from communicating.

An object of the present invention is to enable necessary and sufficient barring of communication of user equipment being served by a cell and being in an idle mode, and that of communication of user equipment newly entering the cell.
Means for Solving the Problem A base station according to one embodiment includes a system information creating unit that creates first system information and second system information, wherein the first system information indicates that communication is barred, and the second system information indicates that the communication is not barred; a timing determination unit that classifies units of user equipment into one or more of a plurality of groups based on timings of the units of the user equipment being in an idle mode to be activated in every discontinuous reception period, and that determines, for each of the plurality of groups, a transmission timing of transmitting a paging signal; and a transmitter, wherein, the transmitter transmits the paging signal to the units of the user equipment belonging to the one or more of the plurality of groups, and subsequently transmits the first system information; the transmitter switches from transmission of the first system information to transmission of the second system information, so that a ratio between a number of times of transmitting the first system information and a number of times of transmitting the second system information corresponds to a barring ratio, wherein the barring ratio is determined in accordance with a congestion level of a cell; and the transmitter transmits the paging signal to the units of the user equipment belonging to the one or more of the plurality of groups, and subsequently transmits the second system information.
Effect of the Present Invention According to the embodiment, the necessary and sufficient barring can be achieved for the communication of the user equipment being served by the cell, and for the communication of the user equipment newly entering the cell.

BRIEF DESCRIPTION OF THE DRAWINGS

FIG. 7 is a diagram showing operation of all groups;

FIG. 8 is a diagram illustrating a method of barring new UE as well as UE being served;

FIG. 10 is a diagram showing an operation example of a case in which a period of changing the group is equal to a period based on a percentage of time.

EMBODIMENTS FOR CARRYING OUT THE INVENTION

Figure 1:
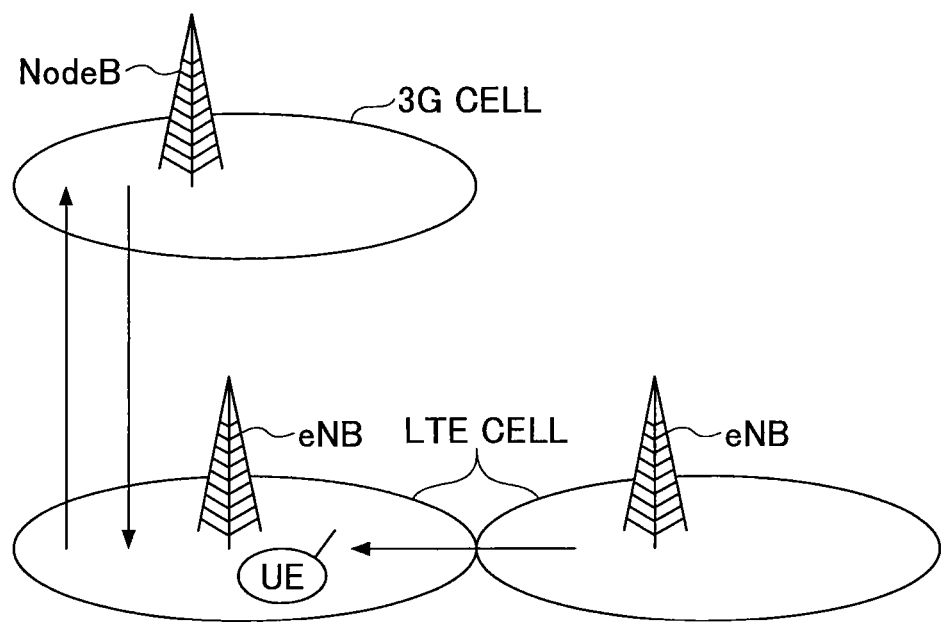
FIG. 1 is a diagram showing an example of a state which is assumed in an embodiment.

According to an embodiment, when a cell is congested, a base station can avoid causing units of user equipment being in an idle mode to simultaneously transfer to another cell. Conversely, the base station can prevent units of user equipment from simultaneously entering the cell. That is because the transfer of the units of the user equipment between the cells is performed in a stepwise manner in accordance with a predetermined ratio, instead of performing simultaneously.

Multiple units of the user equipment being in the idle mode are classified into a plurality of groups, based on a paging receiving timing, which is activated in every discontinuous reception period (DRX period). A paging signal, which indicates that system information is to be received, is transmitted in turns in a unit of one or more groups. Consequently, in a unit broadcasting period, only units of user equipment belonging to particular one or more groups receive the system information, and in a subsequent unit broadcasting period, only units of user equipment belonging to different particular one or more groups receive the system information. Subsequent to the units of the user equipment belonging to the particular one or more groups starting operation based on the updated system information, the units of the user equipment belonging to the different particular one or more groups start operation based on the updated system information. In this manner, since update notification of the system information is made by dividing it into at least two stages, it is possible to mitigate a problem such that all the units of the user equipment simultaneously operate in accordance with the updated system information, and thereby the base station is congested.

User equipment newly entering the cell retrieves the system information indicating the barring by receiving a broadcast signal without receiving a paging signal. In general, barring includes various types of barring, such as barring with respect to call origination, barring with respect to a control signal for requesting location registration, barring with respect to a voice service (VoIP), and barring with respect to CSFB. The embodiment may be used for any type of barring. Here, the Circuit Switched Fall Back (CSFB) is a process for transferring a user from an LTE cell to a 3G cell so as to provide a voice service to the user being served in the LTE cell. When units of user equipment newly entering a cell receive the broadcast signal without receiving the paging signal, they receive the system information indicating that the barring is performed, and all the units of the user equipment newly entering the cell become targets of the barring in the same way. In the embodiment, while barring user equipment of a specific group in accordance with the paging signal, transmission of the first system information and the second system information are temporally switched, so that a ratio between a number of times of transmitting the first system information indicating that the barring is performed and a number of times of transmitting the second system information indicating that the barring is not performed corresponds to a percentage of barring (or a barring rate), which is determined based on a congestion level. The user equipment newly entering the cell receives one of the first system information (100% barring) and the second system information (0% barring). The user equipment which receives the first system information becomes a subject of the barring. The user equipment which receives the second system information does not become the subject of the barring. It depends on a ratio between the number of times of transmitting the first system information and the number of times of transmitting the second system information as to which one is to be received. This ratio is adjusted so as to correspond to the ratio of the barring. In this manner, by adjusting the ratio between the number of times of transmitting the first system information and the number of times of transmitting the second system information to the ratio of the barring, partial barring can be applied to the newly entering units of the user equipment which retrieve the system information without receiving the paging signal.

Hereinafter, the embodiment is explained by referring to the accompanying drawings. In the drawings, the same reference numeral or the same reference symbol is attached to similar elements. The embodiment is explained from the following perspectives.

1. System
2. Base station
3. Operation example of barring UE on a group-by-group basis
4. Operation example of barring new UE as well as UE being served Example 1

<1. System>

FIG. 1 shows an example of a situation which is assumed for the embodiment. There are shown two cells (LTE cells) in a mobile communication system, which is based on the LTE scheme. In each of the cells, a corresponding base station (eNB) is shown. Another cell is shown, a portion of which geographically overlaps with the LTE cell at the left side. The other cell is, for example, a cell of a 3G mobile communication system (3G cell), and there is shown a base station (which is NodeB, BTS, or BS) corresponding to the cell.

As an example, the base station (eNB) of the LTE cell at the left side broadcasts system information indicating that communication is to be barred, and the base station prompts, for example, user equipment being served in the cell and being in an idle mode to transfer to another cell (the 3G cell or the LTE cell). As another example, the user equipment may transfer from the 3G cell (or the LTE cell at the right side) to the LTE cell at the left side. The embodiment can be applied to any directional transfer between the cells.

Switching of the cell may be performed by cell reselection, or by redirection. Usually, switching between the cells based on the same radio access technology is performed by the cell reselection, and that of between the cells based on different RATs is performed by the redirection. However, the embodiment is not limited to such a configuration. The redirection may be performed between the cells based on the same radio access technology (RAT).

Typically, the user equipment (UE) is a mobile station. However, the UE may be a fixed station. In order to enable switching between different types of the radio access technology (RATs), the user equipment (UE) may be required to be operable both in the LTE scheme and in the 3G scheme. Here, the radio access technology (RAT) according to the LTE scheme, the radio access technology (RAT) according to the 3G scheme, and the like are for exemplifying purpose only. Radio access technology other than these schemes may be utilized. The user equipment (UE) can specifically be a cellular phone, an information processing terminal, a high functionality mobile telephone, a smart phone, a tablet computer, a personal digital assistant, a mobile personal computer, or the like. However, the user equipment (UE) is not limited to these. For simplicity of depicting, one 3G cell and two LTE cells are shown. However, the number of the cells may be any number. Here, the LTE scheme and the 3G scheme are exemplified. However, a mobile communication system according to another scheme may be utilized.

<2. Base Station>

Figure 2:
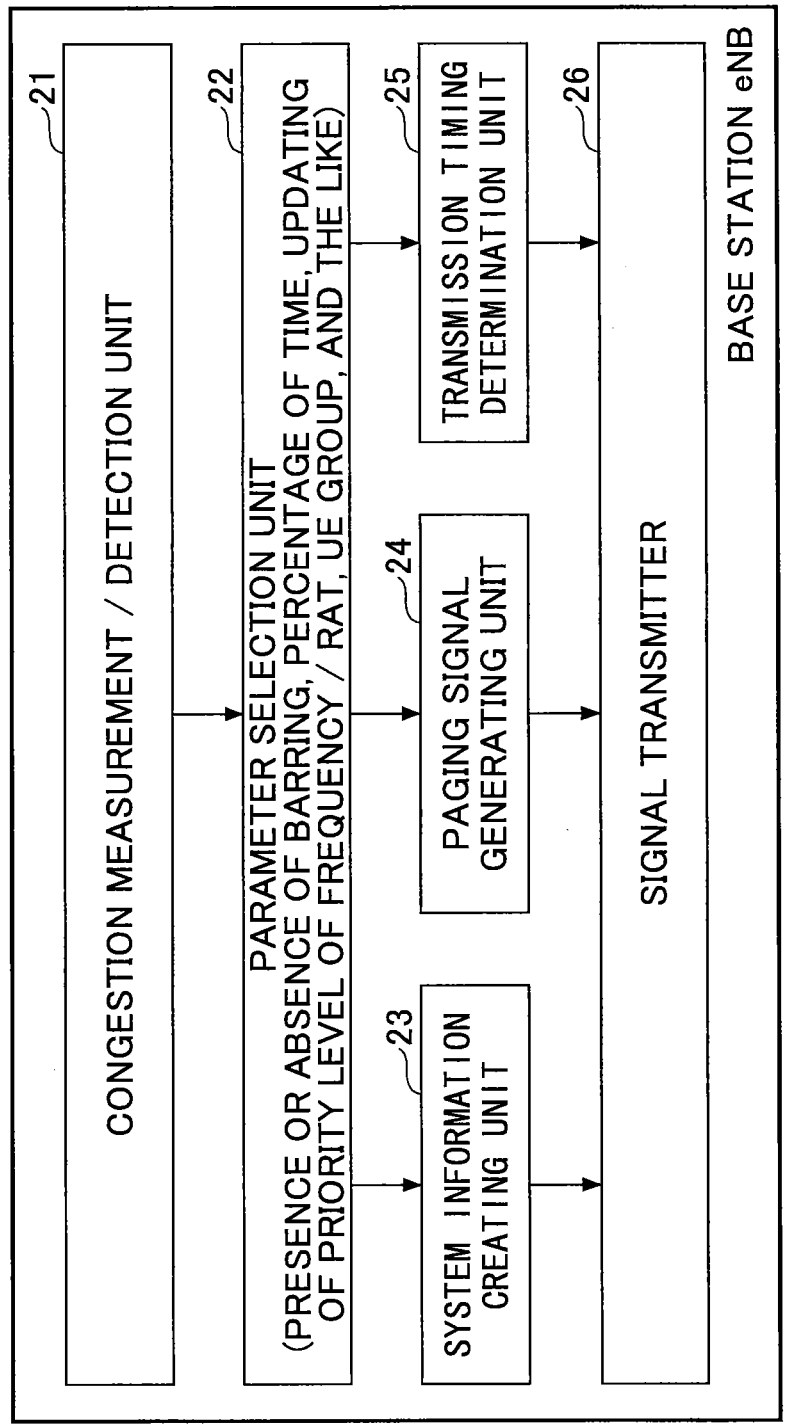
FIG. 2 is a functional block diagram of a base station which is used in the embodiment.

FIG. 2 shows a base station which is utilized in a situation such as shown in FIG. 1. The base station may be a base station (eNB) of an LTE cell, or a base station (BS) of a 3G cell. However, for convenience of the explanation, the base station is assumed to be the base station of the LTE cell. However, the present invention is not limited to this configuration. The present invention may be applied to a base station in any system in which access of user equipment being served in a cell and being in an idle mode and/or access of user equipment newly entering the cell are/is to be regulated. FIG. 2 shows elements which are particularly related to the explanation of the embodiment, among various functional units and processing units included in the base station. The base station includes, at least, a congestion measurement/detection unit 21; a parameter selection unit 22; a system information creating unit 23; a paging signal generating unit 24; a transmission timing determination unit 25; and a signal transmitter 26.

The congestion measurement/detection unit 21 measures or detects a congestion level of a cell. The congestion level may be measured or detected by any suitable method. As an example, the congestion level may be measured or detected by a CPU utilization rate of a base station, a round trip delay (RTD) time period of a testing signal, etc. For example, when a utilization rate of a central processing unit (CPU utilization rate) of a base station is less than 50%, a determination may be made that the cell is not congested. When the CPU utilization rate is greater than or equal to 50%, a determination may be made that the cell is congested. Further, the congestion level may be a binary value representing congested or not congested. The congestion level may be represented by more than two types of numbers or levels. For example, a percentage of the CPU utilization rate may correspond to the congestion level. The congestion measurement/detection unit 21 reports the value of the congestion level to the parameter selection unit 22. As an example, when a congestion level of a cell, which has not been congested, exceeds a predetermined threshold value (when the cell is congested), the congestion measurement/detection unit 21 reports to the parameter selection unit 22 that the congestion level of the cell exceeds the predetermined threshold value, along with the congestion level. Conversely, when the congestion level of the cell, which has been congested, becomes less than the predetermined threshold value, the congestion measurement/detection unit 21 may report to the parameter selection unit 22 that the congestion level of the cell becomes less than the predetermined threshold value, along with the congestion level.

The parameter selection unit 22 selects values of various types of parameters, which are utilized in the embodiment. Specifically, the parameter selection unit 22 selects values of parameters which indicate, for example, (a) state information indicating whether barring is to be applied, (b) information indicating a percentage of time, (c) information of a priority level of a frequency or RAT, and (d) information of groups of user equipment, in accordance with the congestion level.

(a) The state information indicating whether barring is to be applied may be represented by a binary value indicating whether it is congested or not congested, for example. For the case of the mobile communication system according to the LTE scheme, an information element of "cellBarred IE" may be utilized as the state information. When it is not congested, the information element takes a value of "notBarred," and when it is congested, the information element takes a value of "Barred." The state information indicating whether the barring is to be applied is included in the system information. The user equipment which receives the system information indicating presence or absence of the barring is to be operated in accordance with a command of the system information. The system information may include information of a barring level which indicates an extent of barring. Here, the "barring level," a "barring percentage," and a "barring ratio" may be defined to be synonyms of the "congestion level." Alternatively, they may be defined to be terms which are different from the "congestion level." In this specification, they are used as the synonyms. For example, when a value of 20% is indicated as the barring level and the system information indicates that the barring of 20% is applied, and when an attempt is made to transmit a signal, user equipment which receives this information is prevented from transmitting the signal with the probability of 20%, and the user equipment transmits the signal with a probability of 80%. In this example, the probability to be barred is indicated by the system information. However, a transmittable probability may be indicated by the system information. When the system information indicates a value of barring other than 0% and 100%, the processing in the user equipment may be complicated. Thus, it is preferable that the system information to be reported to the user equipment indicates the barring of 0% or 100%. However, in this case, only two states may be achieved such that all units of the user equipment are barred in the same way, or all the units of the user equipment are not barred. Accordingly, necessary and sufficient barring of the communication may not be achieved. As described later, according to the embodiment, partial barring other than 0% and 100% (e.g., the barring level of 20%) can be achieved, while transmitting the system information, which indicates the barring of 0% or 100%, to units of user equipment.

(b) The system information, in general, includes an information element which may be required for the user equipment to properly operate in a cell. However, the embodiment particularly focuses on the system information regarding the barring of the communication. The system information regarding the barring of the communication includes the first system information which indicates that the communication is to be barred and the second system information which indicates that the communication is not to be barred. The former indicates that the communication is barred 100% (100% barring), and the latter indicates that the communication is not barred (0% barring). As described later, transmission of the first system information and transmission of the second system information are temporally switched. In this case, a number of times of transmitting the first system information and a number of times of transmitting the second system information are determined, so that a ratio between the number of times of transmitting the first system information (100% barring) and the number of times of transmitting the second system information (0% barring) coincides with or at least corresponds to a measured congestion level or barring level. The ratio between the number of times of transmitting the first system information and the number of times of transmitting the second system information, which is determined in this manner, is referred to as a "percentage of time."

Suppose that the congestion level or the barring level is 20%, for example. In this case, typically, the percentage of time is also set to be 20%. The number of times of transmitting the first system information (barring of 100%) and the number of times of transmitting the second system information (0%) are determined, so that the ratio between them becomes 20%. When the percentage of time is 20%, it can be considered to repeat transmitting the first system information (barring of 100%) once and transmitting the second system information (0%) four times. Alternatively, it can be considered to repeat transmitting the first system information (barring of 100%) twice and transmitting the second system information (0%) eight times. In general, it can be considered to set the number of times of transmitting the first system information (barring of 100%) to be p, and the number of times of transmitting the second system information (0%) to be 4×p (p=1, 2, . . . ) When the percentage of time is 40%, it can be considered to repeat transmitting the first system information (barring of 100%) twice and transmitting the second system information (0%) three times. Similarly, the number of times of transmitting the first system information and the number of times of transmitting the second system information can be set depending on any percentage of time. From a perspective of representing a congestion level by a ratio between the numbers of times of transmitting the corresponding system information, it is preferable that the total number S of transmitting the system information be an integral multiple of 100/Y (Y is a resolution % of the congestion level). For example, if the congestion level can be measured at an accuracy of 5%, it is preferable that the total number S of the number of times of transmitting the first system information and the number of times of transmitting the second system information be 20, 40, or 60, for example.

Here, it is not mandatory that the congestion level or the barring level strictly coincides with the percentage of time. For example, the congestion level or the barring level of 23% may correspond to the percentage of time of 20%. More generally, the congestion level or the barring level belonging to a certain numerical range is associated with a specific percentage of time.

(c) The information of the priority level of the frequency or the radio system (RAT) indicates a priority level of the frequency or the radio system (RAT), which is to be utilized by user equipment. Such information of the priority level may be included in the system information. By suitably changing the priority level of the frequency or the radio system (RAT), the frequency or the radio system (RAT) can be specified, with which the user equipment is to select a cell. When a priority level of another frequency is set to be higher than the priority level of the frequency of the serving cell of the user equipment, the user equipment is to select a cell of the other frequency.

(d) The information of the groups of the user equipment includes, for example, information indicating which one of a plurality of groups the user equipment being in an idle mode belongs to, or information indicating a total number $M_G$ of the groups. During the idle mode, the user equipment activates at every discontinuous reception period (DRX), and the user equipment determines whether to transfer to a normal reception mode by receiving and demodulating a control signal. If it is necessary to transfer, the user equipment quickly transfers. If it is not necessary, the user equipment stays in the idle mode, and the user equipment pauses until the next timing for activation. The parameter selection unit 22 classifies the user equipment into one of the groups, based on the timings of the user equipment being in the idle mode to be activated in every discontinuous reception period (DRX period).

Figure 3:
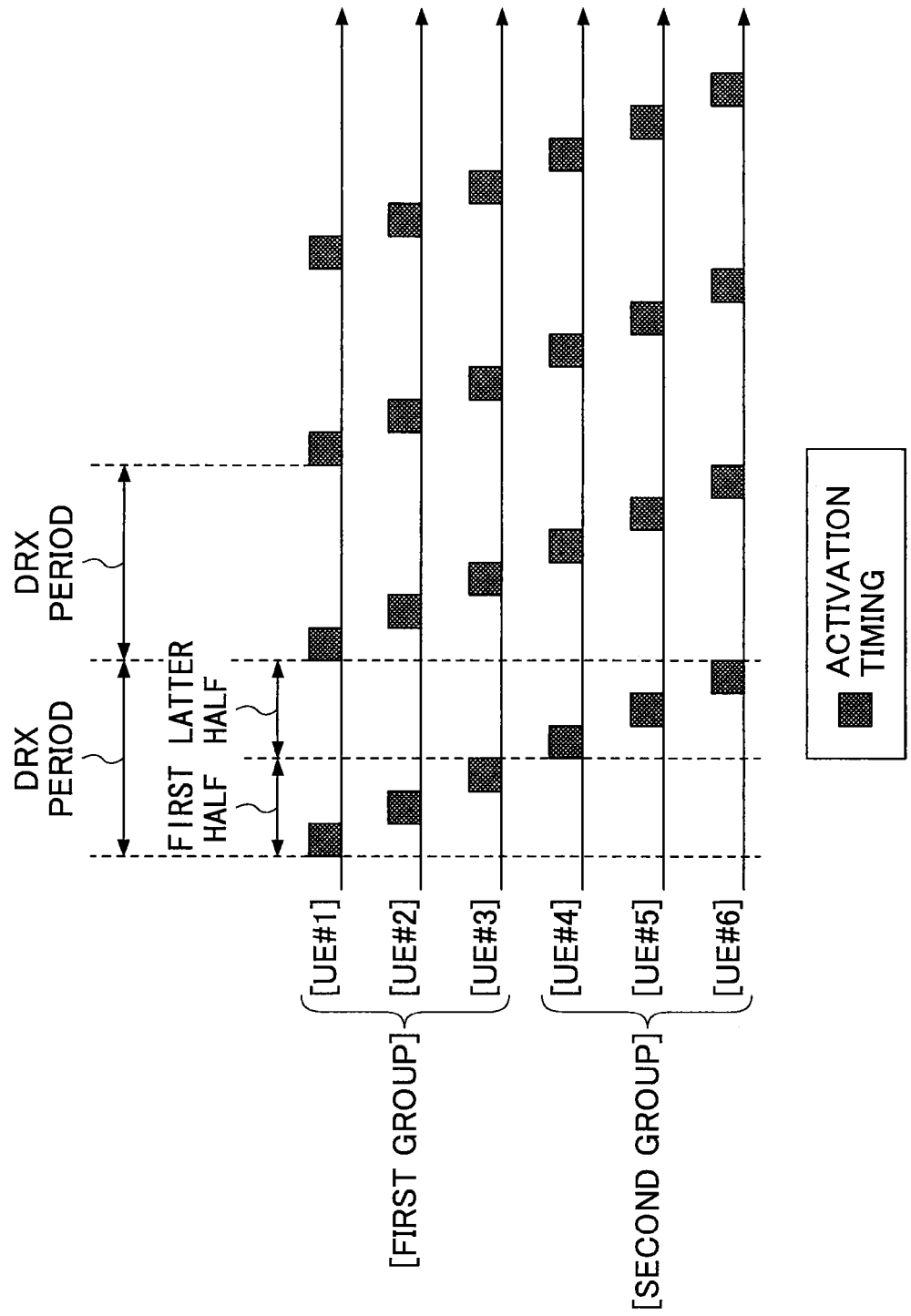
FIG. 3 is a diagram illustrating a method of classifying units of user equipment by activation timing.

FIG. 3 shows a situation where various types of units of user equipment UE#1-UE#6 are activated in every discontinuous reception period (DRX period). These units of the user equipment are activated in the corresponding discontinuous reception periods (DRX periods) having the same length. However, the timings of the activation are different depending on the units of the user equipment. It may be considered that the timings at which the units of the user equipment being in the idle mode are activated are distributed with an equal probability in a time axis. Based on the activation timings which are distributed in this manner, the units of the user equipment being in an discontinuous reception mode (namely, in the idle mode) can be classified into a plurality of groups. For the case of the example shown in FIG. 3, while setting the timing at which the unit of the first user equipment UE#1 is activated as a reference time point, the units of the user equipment UE#1, UE#2, and UE#3, which are activated in a first half interval of the DRX period, are classified into a first group. The units of the user equipment UE#4, UE#5, and UE#6, which are activated in the latter half interval of the DRX period, are classified into a second group. In this manner, the units of the user equipment are classified or divided into the two groups. The number of the classified or divided groups may be set to be any number which is greater than two. In this case, the DRX period may be divided into more than two intervals. The parameter selection unit 22 determines parameters of group information. The parameters of the group information indicate a manner of classifying units of user equipment being in the idle mode into groups (a manner of grouping). Specifically, values are determined for a parameter indicating the total number of the groups $M_G$, parameters for identifying the groups to which the units of the user equipment being in the idle mode belong, and the like.

The parameter selection unit 22 selects the values of the parameters, which indicate (a) the state information indicating whether the barring is to be applied, (b) the information indicating the percentage of time, (c) the information of the priority level of the frequency or the RAT, (d) the information of the groups of the user equipment, and the like, depending on the congestion level. In this case, it is not mandatory that the parameters of both (a) the state information and (c) the information of the priority level are selected. That is because the congestion can be avoided by updating any one of the system information. Accordingly, in general, when the congestion level is greater than or equal to a predetermined value, the parameter selection unit 22 determines a way to avoid the congestion, and the parameter selection unit 22 selects the parameters of one or more of (a) the state information, (b) the percentage of time, and (c) the priority level. Here, in the embodiment, it is assumed that at least (a) the state information indicating whether the barring is to be applied is utilized. The parameters selected by the parameter selection unit 22 are reported to the system information creating unit 23, the paging signal generating unit 24, and the transmission timing determination unit 25.

The system information creating unit 23 creates or edits system information. For a case in which a base station of a cell, which is not congested, attempts to avoid congestion, in general, the base station updates at least one of (a) the state information, (b) the percentage of time, and (c) the priority level. For example, (the state information including) the state information indicating that barring is not applied is updated to be (the system information including) the state information indicating that the barring is applied. Alternatively, the system information is updated, so that the priority level of a frequency or RAT of another cell becomes greater than that of the frequency or the RAT of the own cell. In the embodiment, it is assumed that the system information includes at least (a) the state information indicating whether the barring is to be applied. The system information creating unit 23 prepares the system information, which is updated in this manner. For convenience of the explanation, the system information including the state information indicating that the cell is barred is referred to as the "first system information," and the system information including the state information indicating that the cell is not barred is referred to as the "second system information."

Here, the system information indicating the information such as the state information, the percentage of time, and the priority level is updated, not only for the case in which the cell, which is not congested, becomes congested, but also for a case in which the cell, which is congested, becomes able to accommodate the user equipment as usual. In this case, for example, the information which indicates that the barring is applied is updated to be the information indicating that the barring is not applied. Namely, the first system information is updated to be the second system information. Alternatively, the system information is updated, so that the priority level of the frequency or the RAT of the own cell becomes greater than that of the frequency or the RAT of the other cell.

The paging signal generating unit 24 creates or edits a paging signal to be transmitted to the user equipment being in the discontinuous reception mode. The paging signal is a signal for reporting to the user equipment that there was an incoming call or the system information is to be received, for example. In the embodiment, the paging signal is used especially for reporting to the user equipment that the system information is to be received. The system information is transmitted from the base station at predetermined timings in each unit broadcasting period of a sequence of the unit broadcasting periods.

Figure 4:
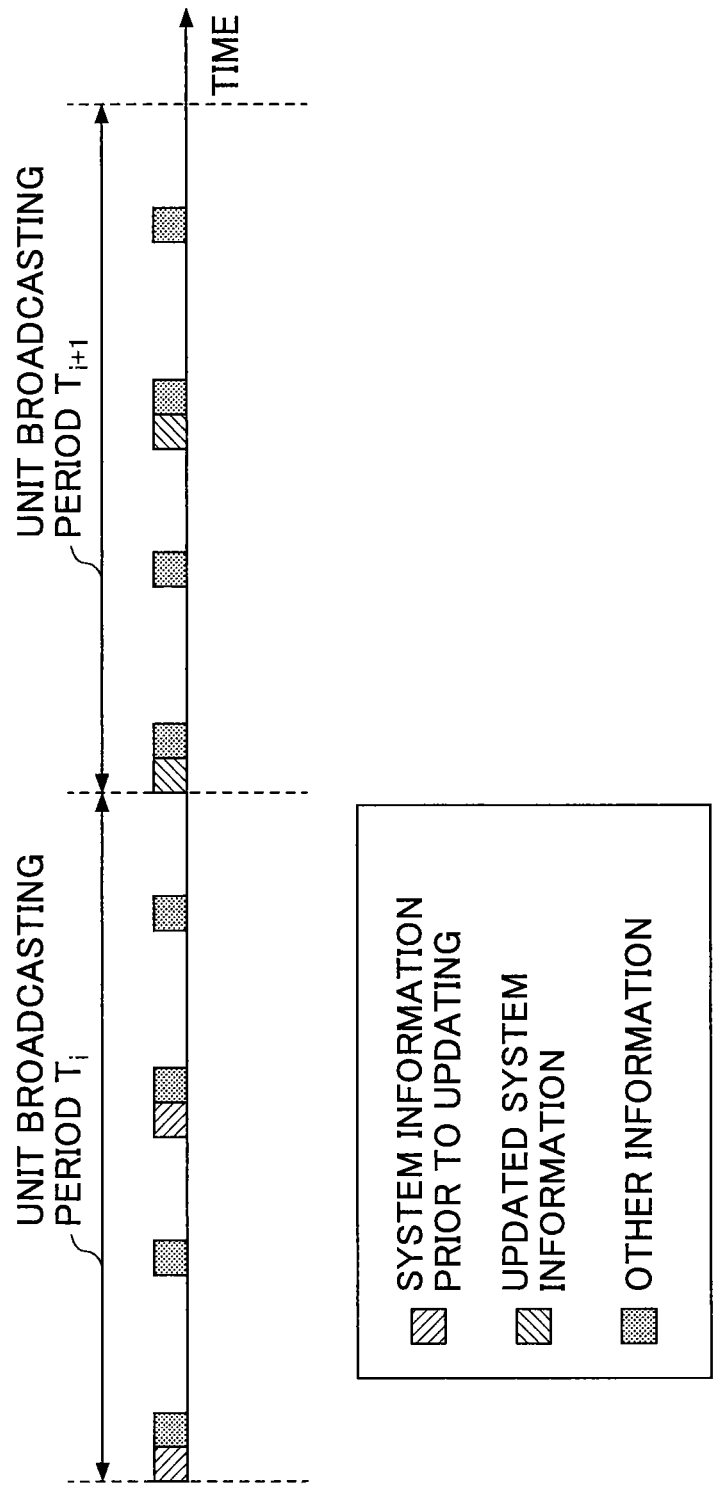
FIG. 4 is a diagram showing a situation in which system information is transmitted.

FIG. 4 schematically shows the timings of transmitting the system information. The system information is transmitted at the predetermined timings in each unit broadcasting period of the sequence of the unit broadcasting periods. The length of the unit broadcasting period is uniquely determined in the system, so that the length becomes an integral multiple (e.g., four times) of the discontinuous reception period of the user equipment. For example, the length may be 2560 milliseconds.

However, the length is not limited to this numerical example. The unit broadcasting period may correspond to an interval such as the "modification period" in the LTE scheme. However, the embodiment is not limited to such a configuration. The predetermined timings and the periods of transmitting the system information are suitably determined by an operator, and they are transmitted to the user equipment as a part of the system information. The system information in the unit broadcasting period may be updated depending on necessity. As described above, the system information indicating the information such as the state information of the barring, the priority level of the frequency, or the like, may be updated in accordance with the congestion level of the cell. In order to prompt reception of the updated system information, the paging signal is utilized. In a unit broadcasting period $T_i$, when the user equipment being in the idle mode receives a paging signal at a timing at which the user equipment is discontinuously activated, the user equipment stays in the discontinuous reception mode until the next unit reporting period $T_{i+1}$, and the user equipment is activated from the next unit reporting period $T_{i+1}$ and receives the system information. In the unit reporting time period $T_i$, when the user equipment being in the idle mode does not receive such a paging signal, the user equipment stays in the discontinuous reception mode, and the user equipment may not receive the system information in the next unit reporting period $T_{i+1}$.

The transmission timing determination unit 25 of FIG. 2 determines a transmission timing of a signal, which is transmitted from the base station (eNB). In general, signals transmitted from the base station (eNB) include a control signal and a user traffic signal (which includes an audio signal (VoIP) and data). Among these, the embodiment particularly focuses on timings of transmitting a paging signal and the system information (broadcast information).

The transmission timing determination unit 25 determines a notification timing (paging timing) of the paging signal, so that only the units of the user equipment belonging to one of the plurality of groups can receive the paging signal. As described above, the parameter selection unit 22 groups the units of the user equipment being in the idle mode by the timings at which the corresponding units of the user equipment being in the idle mode are activated. Accordingly, by dividing the discontinuous reception period into the corresponding groups, the paging signal can be transmitted to the one of the plurality of groups, while limiting the destination to be the one of the plurality of groups.

For the case of the example shown in FIG. 3, there exist the first group and the second group. The first group is activated in the first half of the DRX period. The second group is activated in the latter half of the DRX period. Thus, the first half interval of the DRX period is determined to be the timing (the notification timing of the paging signal) for the units of the user equipment belonging to the first group. The latter half interval of the DRX period is determined to be the timing (the notification timing of the paging signal) for the units of the user equipment belonging to the second group. As a result, for example, in the first unit broadcasting period, when the base station transmits the paging signal in the first half interval of the DRX period, only the units of the user equipment belonging to the first group receive the paging signal, and these units of the user equipment are activated from the second unit broadcasting period, and receive the system information. Since the system information includes the updated system information (e.g., the information indicating that the barring is applied), the units of the user equipment of the first group attempt to operate in accordance with the updated system information. However, since the units of the user equipment belonging to the second group do not receive the paging signal in the first unit broadcasting period, these units of the user equipment do not receive the system information in the second unit broadcasting period, and these units of the user equipment do not attempt to operate in accordance with the updated system information (they continue operating in accordance with the system information prior to the change). In the second and subsequent unit broadcasting periods, the base station causes only the units of the user equipment belonging to the second group to receive the paging signal by transmitting the paging signal only in the latter half interval of the DRX period. By doing this, the units of the user equipment belonging to the second group are activated and receive the system information in the third and subsequent unit broadcasting periods, and they attempt to operate in accordance with the updated system information.

The transmission timing determination unit 25 determines not only the transmission timing of the paging signal, but also the transmission timing of the system information. The parameter selection unit 22 determines the percentage of time depending on the congestion level. The percentage of time is a ratio between the number of times of transmitting the first system information and the number of times of transmitting the second system information. Here, the first system information indicates that the barring is to be applied, and the second system information indicates that the barring is not to be applied. The transmission timing determination unit 25 concretely determines a timing of transmitting the first system information and a timing of transmitting the second system information, based on the percentage of time. A specific example of the transmission timing is explained in the operation example.

In addition to transmitting a generic control signal and a data signal, the signal transmitter 26 transmits a paging signal, which indicates that the updated system information is to be received, and the updated system information to the user equipment.

<3. Operation Example of Barring UE on a Group-by-Group Basis>

Figure 5:
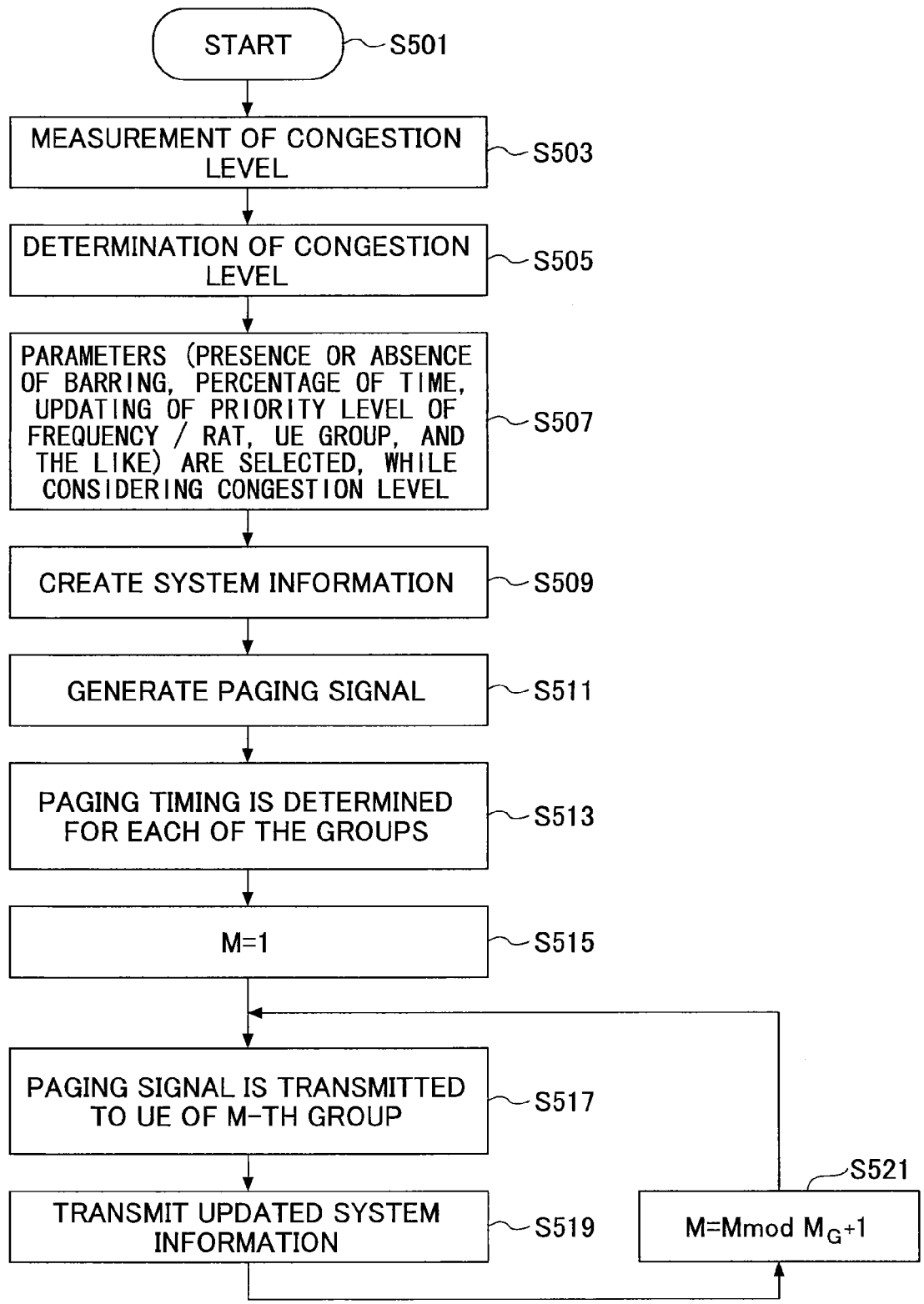
FIG. 5 is a flowchart showing an operation example of barring UE for each of groups.

FIG. 5 shows a flowchart of the operation example, which is performed by the base station such as shown in FIG. 2. The flow starts from step S501, and the flow proceeds to step S503.

At step S503, the base station measures the congestion level of the cell by the congestion measurement/detection unit 21.

At step S505, the base station determines whether the congestion level is greater than or equal to a predetermined value. When the congestion level is greater than or equal to the predetermined value, the congestion measurement/detection unit 21 of the base station reports to the parameter selection unit 22 that system information for avoiding the congestion is to be created, along with the congestion level. When the congestion level is less than the predetermined value, the congestion measurement/detection unit 21 of the base station reports to the parameter selection unit 22 that system information for accommodating the user equipment is to be created, along with the congestion level.

At step S507, the base station sets, by the parameter selection unit 22, values of various types of parameters to be values corresponding to the congestion level. When it is congested, the parameter selection unit 22 determines a way of avoiding the congestion. Specifically, the values of the parameters indicating (a) the state information indicating whether the barring is to be applied, (b) the information indicating the percentage of time, (c) the information of the priority level of the frequency or the RAT, (d) the information of the groups of the user equipment, and the like are selected depending on the congestion level. When it is not congested, the values of these parameters are not updated, in principle. However, when the state is immediately after returning from the congestion state to a normal state, the values of these parameters are updated to be the values for accommodating the user equipment, as usual.

At step S509, the base station creates the system information by the system information creating unit 23. In general, the system information for the case in which it is necessary to avoid the congestion of the cell is (a) the state information, (b) the percentage of time, (c) the priority level, (d) the group information, and the like. In the embodiment, it is assumed that the system information includes the information (a) and (b), which is concerned with the cell being barred. The system information for the case in which the state returns from the congestion state to the normal state is, in general, (a) the state information, (b) the percentage of time, (c) the priority level, (d) the group information, and the like. In the embodiment, it is assumed that the system information includes the information (a) and (b), which is concerned with the cell not being barred.

At step S511, the base station creates the paging signal by the paging signal generating unit 24. In this case, the paging signal indicates that the user equipment, which receives the paging signal and which is in the idle mode, is to be activated and to receive the system information from the next unit broadcasting period.

At step S513, the base station determines, by the transmission timing determination unit 25, the notification timing (paging timing) for transmitting the paging signal to the user equipment. The notification timing is adjusted to the timing at which the user equipment, which is classified into a group, is activated.

Here, for convenience of the explanation and depiction, it is indicated that steps S509, S511, and S513 are to be executed in this order. However, it is not mandatory. Steps S509, S511, and S513 may be executed in another order, or a part of or all the processes of the plurality of steps may be simultaneously executed.

At step S515, a parameter M, which specifies a group number, is set to be one. In the embodiment, since two or more groups exist, the total number of the groups $M_G$ is greater than one. As an example, it is assumed that $M_G=5$. However, the total number of the groups $M_G$ may be any number.

At step S517, the base station transmits the paging signal, while adjusting the transmission timing to the timing at which the user equipment belonging to the M-th group is activated. This paging signal is only received by the units of the user equipment belonging to the M-th group, among the units of the user equipment being in the idle mode. The paging signal is not received by the units of the user equipment belonging to a group other than the M-th group.

At step S519, the base station transmits a broadcast signal including the updated system information at a predetermined timing, which is included in a sequence of unit broadcasting periods.

At step S521, the parameter M, which specifies a group, is incremented. However, if M exceeds the total number of the groups $M_G$, M is updated to be a value which does not exceed $M_G$. Subsequently, the flow returns to step S517, and the already explained processes are repeated.

Figure 6:
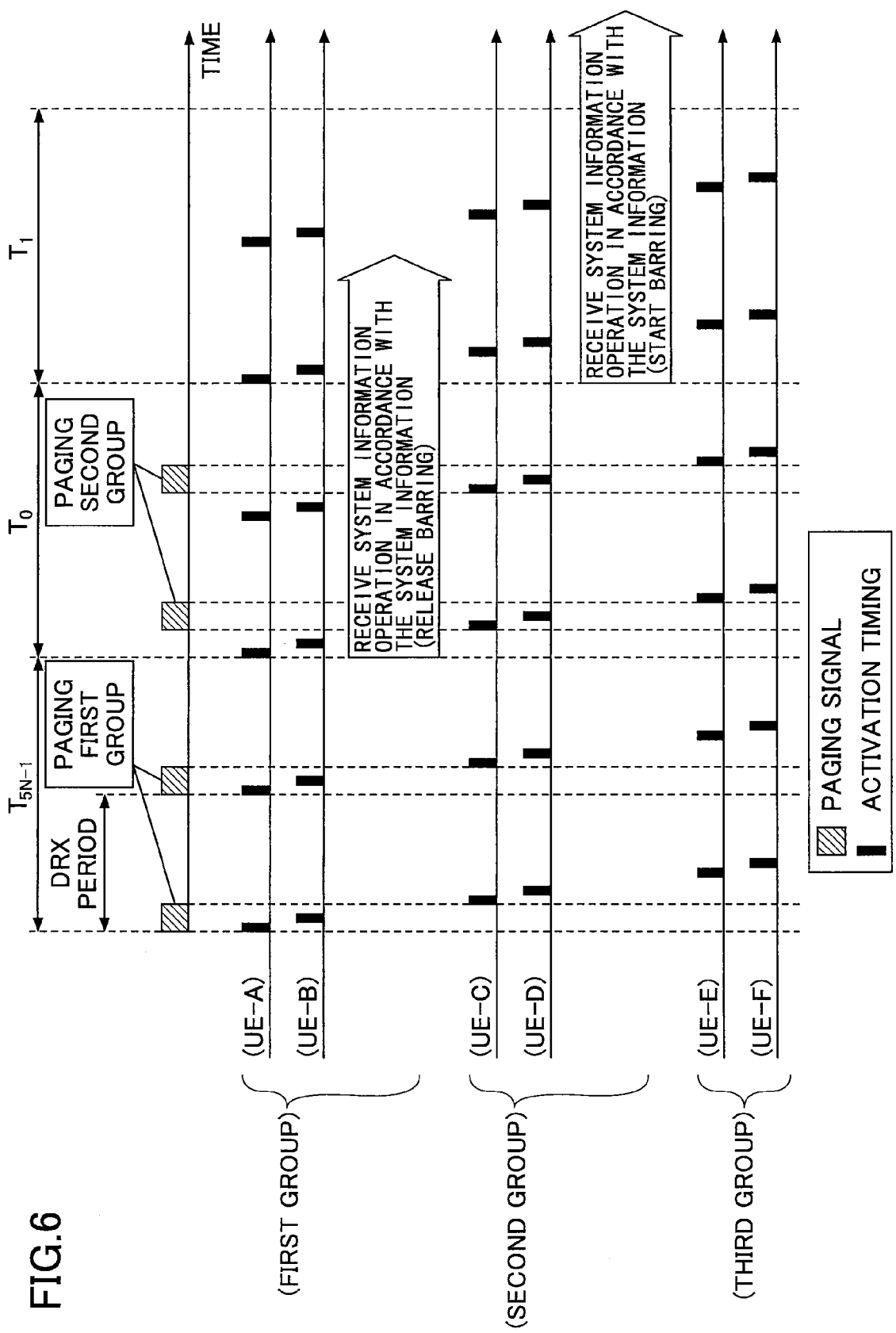
FIG. 6 is a diagram illustrating details of operation.

FIG. 6 is a diagram for illustrating the operations relating to steps S517 and S519 of FIG. 5 in detail. For convenience of the explanation, suppose that units of the user equipment UE-A and UE-B belong to the first group; units of the user equipment UE-C and UE-D belong to the second group; and units of the user equipment UE-E and UE-F belong to the third group. Since the total number of the groups $M_G$ is 5, actually the fourth group and the fifth group exist. However, for simplicity of the depiction, the fourth group and the fifth group are not shown in FIG. 6. The system information is transmitted at a predetermined timing in each unit broadcasting period of the sequence of the unit broadcasting periods. The unit broadcasting period is set to be equal to two discontinuous reception periods (DRX periods). By dividing the DRX period by a number corresponding to the total number of the groups, a timing of the paging signal is defined for each of the groups. Here, the numerical values are for exemplifying purpose only, and any suitable numerical value may be utilized. Three unit broadcasting periods $T_{5N-1}$, $T_0$, and $T_1$ are shown, so that they are consistent with a specific example, which is described later. Here, N indicates that the period of changing the group is equal to N unit broadcasting periods. For the case of the current example, there are five groups ($M_G=5$). When the processing of the first group G1 to the fifth group G5 is completed, the processing with respect to the first group G1 is executed again. Accordingly, the processing of the first group to the fifth group is performed during 5N unit broadcasting periods $T_0$-$T_{5N-1}$, and the processing is repeated.

For convenience of the explanation, suppose that, first, the base station transmits the paging signal to the first group G1 in the unit broadcasting period $T_{5N-1}$. This paging signal is not received by user equipment which belongs to one of the second through fifth groups. The units of the user equipment UE-A and UE-B, which belong to the first group G1, receive the paging signal in the unit broadcasting period $T_{5N-1}$, and they stay in the discontinuous reception mode, until the next unit broadcasting period $T_0$. Upon starting of the unit broadcasting period $T_0$, the units of the user equipment UE-A and UE-B are activated, and they receive the system information. Since the system information includes, for example, barring information in the cell, and information indicating the priority level of the frequency or the RAT, the units of the user equipment UE-A and UE-B attempt to operate in accordance with the system information in the unit broadcasting period $T_0$. For the current operation example, the second system information, which indicates that the barring is not applied, is transmitted in the unit broadcasting period $T_0$. The second system information is received by the units of the user equipment of the first group G1, and the barring is released for these units of the user equipment.

In addition to transmitting the second system information, the base station transmits the paging signal to the units of the user equipment UE-C and UE-D, which belong to the second group G2, in the unit broadcasting period $T_0$. This paging signal is not received by user equipment which belongs to one of the first group, and the third through the fifth groups. The units of the user equipment UE-C and UE-D, which belong to the second group G2, receive the paging signal in the unit broadcasting period $T_0$, and they stay in the discontinuous reception mode, until the next unit broadcasting period $T_1$. Upon starting of the unit broadcasting period $T_1$, the units of the user equipment UE-C and UE-D are activated, and they receive the system information. Since the system information includes, for example, the barring information in the cell, and the information indicating the priority level of the frequency or the RAT, the units of the user equipment UE-C and UE-D attempt to operate in accordance with the system information in the unit broadcasting period $T_1$. In the current operation example, the first system information, which indicates that the barring is applied, is transmitted in the unit broadcasting period $T_1$. The first system information is received by the units of the user equipment of the second group G2, and communication by these units of the user equipment is barred.

FIG. 7 shows a situation such that, in the operation example such as shown in FIGS. 5 and 6, the units of the user equipment of the five groups G1-G5 become the targets of the barring in turns corresponding to one of the N unit broadcasting periods. During a time interval in which one of the groups is the subject of the barring, other groups are not the subject of the barring. In this manner, the barring rate of ⅕×100=20% is achieved in the entire cell. These numerical values are for exemplifying purpose only, and any suitable numerical value may be used. For example, when a barring rate of 40% is to be achieved, it suffices if units of user equipment of two groups among five groups receive the paging signal, and subsequently these units receive the system information. More generally, it suffices if a certain numerical range of the congestion level is associated with a specific number of groups. It is preferable that the total number of the groups $M_G$ ($M_G=100/Y$) be determined depending on the resolution Y% of the congestion level or the barring rate. For example, when the congestion level is measurable at the accuracy of 5%, it is preferable that the total number of the groups be greater than or equal to 20.

In this manner, in the embodiment, the timing of receiving the system information is changed on a group-by-group basis, and reporting of the system information to multiple units of the user equipment is performed by dividing the process into two or more steps. With this, the problem can be effectively resolved such that all the units of the user equipment operating in the idle mode simultaneously attempt to operate in accordance with the system information, and consequently the transfer target cell is congested. For example, if all the five groups are barred, all the five groups attempt to switch the cell, and it is possible that congestion occurs in the transfer target cell. In contrast, in the embodiment, suppose that the congestion level which is measured by the base station is 20%, and suppose that if 20% of the units of the user equipment within the cell are caused to transfer to another cell, the base station is not congested. In this case, by barring only the units of the user equipment belonging to one of the five groups, the base station can cause 20% of the units of the user equipment to transfer to the other cell.

In this manner, the base station can avoid excessive barring. Furthermore, it can be expected that the transfer target cell can accept 20% of the units of the user equipment, without causing the congestion. According to the embodiment, necessary and sufficient barring of the units of the user equipment (which are served in the cell and which are in the idle mode) can be achieved.

<4. Operation Example of Barring New UE as Well as UE Being Served>

For the case of the operation example related to FIGS. 5, 6, and 7, the units of the user equipment being served in the cell are divided into a plurality of groups. The number of the groups to be simultaneously barred is determined depending on the congestion level, and the paging signal is transmitted only to the units of the user equipment of the number of the groups. After that, only the units of the user equipment of the groups, which receive the paging signal, receive the updated system information. In this manner, the units of the user equipment being in the idle mode are prevented from simultaneously operating in accordance with the updated system information. For example, only a suitable percentage of units of the user equipment can be barred, or can be released from the barring.

Not only the user equipment being served in the cell and in the idle mode, but also user equipment which enters the cell by the cell reselection or the redirection, or user equipment whose power supply is turned on immediately before, may be barred. For convenience of the explanation, the user equipment which enters the cell by the cell reselection or the redirection and the user equipment whose power supply is turned on immediately before are collectively referred to as the "new user equipment." Among the units of the user equipment being in the idle mode and the units of the new user equipment, for the units of the user equipment being in the idle mode, a part of the units of the user equipment can be barred or can be released from barring, by the above described operation example. However, the units of the new user equipment may receive the broadcast signal and retrieve the system information, without receiving the paging signal. Thus, all the units of the new user equipment may be barred, or may start communication without being barred. In this case, similar to the problem of concern for the case in which the units of the user equipment being in the idle mode are not grouped, the problem of concern is that multiple units of the new user equipment are simultaneously barred, or simultaneously start communication.

The problem is explained by referring to FIG. 7. Generally, by repeating the operation five times, which is similar to that of the N unit broadcasting periods of $T_0$-$T_{N-1}$, 20% of the units of the user equipment are barred, among the units of the user equipment being in the idle mode. In the unit broadcasting period $T_0$, in order to release the barring of the first group G1, the second system information (0% barring), which indicates that barring is not applied, is transmitted. In the next unit broadcasting period $T_1$, in order to bar the second group G2, the first system information (100% barring), which indicates that barring is applied, is transmitted. Subsequently, the first system information (100% barring), which indicates that the barring is applied, is transmitted, until the unit broadcasting period $T_{N-1}$. In this case, in the N-1 unit broadcasting periods $T_1$-$T_{N-1}$, the first system information (100% barring), which indicates that the barring is applied, is transmitted. Accordingly, the units of the new user equipment receive the second system information (0% barring) with a probability of 1/N, and the units of the new user equipment receive the first system information (100% barring) with a probability of (N-1)/N. Thus, in most cases, the units of the new user equipment receive the first system information (100% barring). Namely, most of the units of the new user equipment are barred. If there are a great number of units of the new user equipment, many units of the new user equipment attempt to transfer to another cell, for example, whereas the other cell may be congested.

Here, it is not mandatory that the first system information (100% barring) is transmitted in a time interval from the paging signal at the unit broadcasting period $T_0$ (start paging signal), which is for starting barring, to the paging signal at the unit broadcasting period $T_{N-1}$ (end paging signal), which is for terminating the barring. Further, since no paging signals are transmitted in the time interval between the start paging signal and the end paging signal, no units of the user equipment of the groups (no units of the user equipment being in the idle mode) receive the system information. Accordingly, operations of the units of the user equipment being in the idle mode are not affected by any system information, which is transmitted in the time interval between the start paging signal and the end paging signal. From such a perspective, in this operation example, in the time interval between the start paging signal and the end paging signal, transmission of the first system information (100% barring) and transmission of the second system information (0% barring) are switched in accordance with a ratio which is indicated by the congestion level.

FIG. 8 shows a diagram illustrating this operation example. FIG. 8 shows a method of transmitting the system information in the N unit broadcasting periods $T_0$-$T_{N-1}$. Similar to the above-described example, suppose that the congestion level is 20%. Further, for convenience of the explanation, N is set to be 20. As shown in the figure, in the nineteen unit broadcasting periods $T_1$-$T_{19}$ on and after $T_1$, among the twenty unit broadcasting periods $T_0$-$T_{19}$, the first system information is transmitted with a probability of 1/5 (20%), instead of transmitting the first system information (100%). Namely, in the four unit broadcasting periods $T_1$, $T_6$, $T_{11}$, and $T_{16}$, the first system information (100% barring) is transmitted, and in the other unit broadcasting periods, the second system information (0% barring) is transmitted. Accordingly, in the N=20 pieces of the unit broadcasting period, the units of the new user equipment receive the first system information (100% barring) with the probability of 1/5 (20%), and the units of the new user equipment receive the second system information (0% barring) with the probability of 4/5 (80%). Thus, 20% barring can be achieved with respect to the units of the new user equipment. By repeating the similar operation for the unit broadcasting periods on and after $T_{20}$, the 20% barring can be achieved for the units of the new user equipment. In this manner, by switching the transmission of the first system information (100% barring) and the transmission of the second system information (0% barring) in accordance with the ratio of the congestion level, partial barring can be applied to the units of the new user equipment as well as the units of the user equipment being served in the cell and being in the idle mode. In the example shown in FIG. 8, the first system information (100% barring) is transmitted once and the second system information (0% barring) is transmitted four times repeatedly. However, this is not mandatory for this operation example. It may be that the first system information (100% barring) is transmitted two times and the second system information (0% barring) is transmitted ten times repeatedly.

Figure 9:
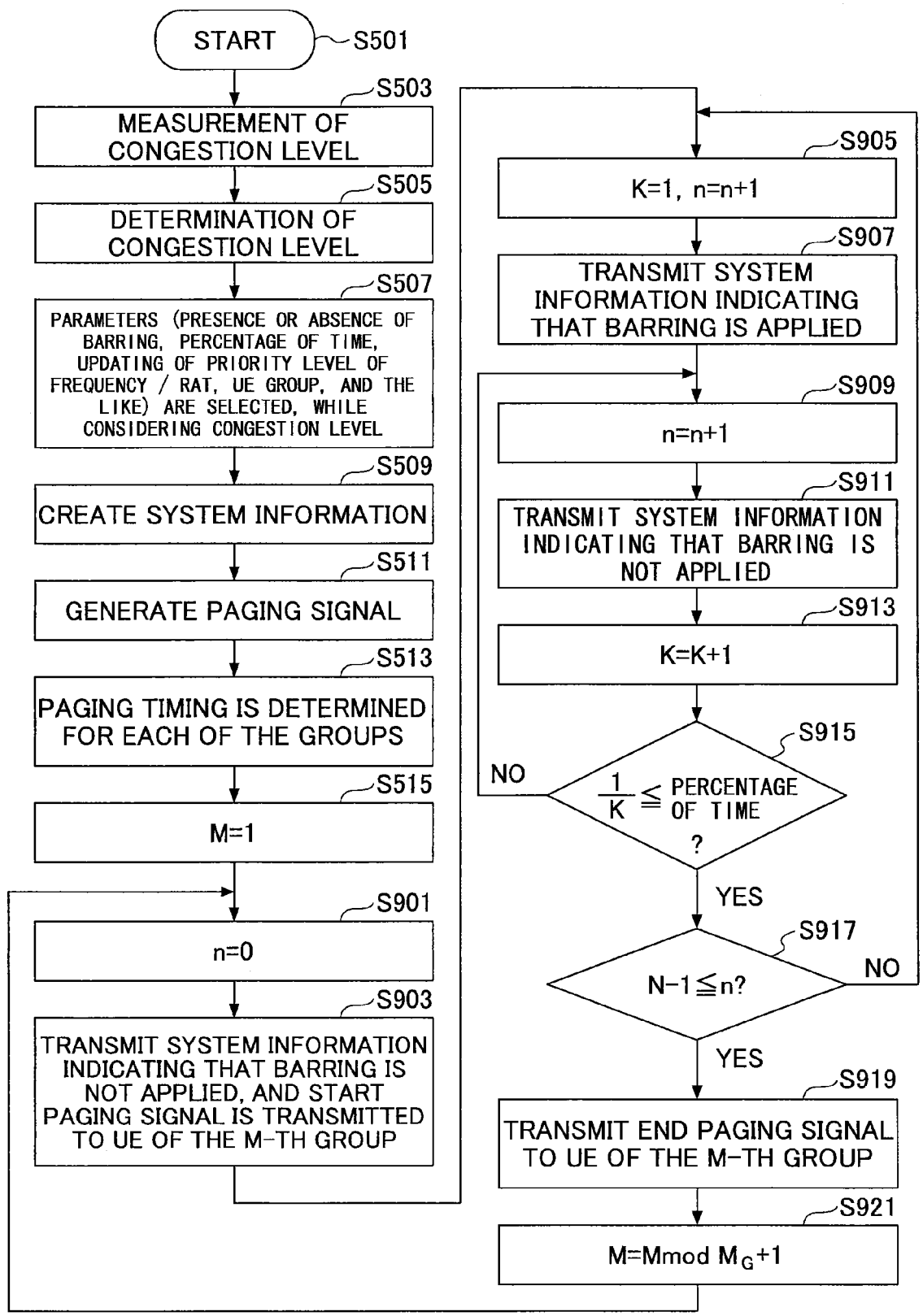
FIG. 9 is a flowchart for achieving the method which is shown in FIG. 8.

FIG. 9 shows a flowchart for executing the method of transmitting the system information such as shown in FIG. 8. Steps S501 through S515 are substantially the same as those of the flowchart which is shown in FIG. 5. Thus, the overlapped explanations are omitted.

At step S901, a time parameter n is initialized to zero. The time parameter n corresponds to a single unit broadcasting period, and n=0 corresponds to $T_0$.

At step S903 (at the unit broadcasting period $T_0$), the base station transmits the second system information, which indicates that barring is not applied, and transmits the paging signal (the start paring signal) at a timing, which is adjusted to the timing at which units of the user equipment belonging to the M-th group are activated. This paging signal is received only by the units of the user equipment belonging to the M-th group, among the units of the user equipment being in the idle mode, and this paging signal is not received by the units of the user equipment belonging to the other groups.

At step S905, a parameter K, which is related to the percentage of time, is initialized to one. As described above, the percentage of time corresponds typically to the congestion level or the barring level. As an example, the percentage of time=the congestion level=20%. Additionally, the time parameter n is incremented.

At step S907 (at the unit broadcasting period $T_1$), the base station transmits the first system information, which indicates that barring is applied.

At step S909, the time parameter n is incremented.

At step S911, the base station transmits the second system information, which indicates that barring is not applied.

At step S913, the parameter K is incremented, which is related to the percentage of time.

At step S915, a determination is made as to whether 1/K is less than or equal to the percentage of time, which is determined at step S507. When the percentage of time is 20%=0.2, a determination is made as to whether 1/K is less than or equal to 0.2. When 1/K is greater than the percentage of time, which is determined at step S507, the flow returns to step S909, and the already explained process is executed. Repeating steps S909, S911, S913, and S915 corresponds to repeatedly transmitting the second system information (0%) in FIG. 8.

At step S915, when 1/K is less than or equal to the percentage of time, which is determined at step S507, the flow proceeds to step S917.

At step S917, a determination is made as to whether the time parameter n is greater than or equal to N-1. For the case of the example which is shown in FIG. 8, "N," which corresponds to the period of changing the group, is 20 (N=20). When the time parameter n is less than N-1, the flow returns to S905, and the already explained process is executed. When the time parameter is greater than or equal to N-1, the flow proceeds to step S919.

At step S919 (at the unit broadcasting period $T_{N-1}$), the base station transmits the paging signal (the end paging signal) at a timing, which is adjusted to the timing at which the units of the user equipment belonging to the M-th group are activated. This paging signal is received only by the units of the user equipment belonging to the M-th group, among the units of the user equipment being in the idle mode, and the paging signal is not received by the units of the user equipment belonging to the other groups.

At step S921, the parameter M, which specifies the group, is incremented. However, when M exceeds the total number of the groups $M_G$, the value is changed to a value which does not exceed $M_G$. Subsequently, the flow returns to step S901, and the already explained process is repeated.

For convenience of the explanation, in the example which is shown in FIG. 8, the period of changing the group to be barred is twenty unit broadcasting periods, and the period for transmitting the first system information (100% barring) is five unit broadcasting periods, so as to achieve the percentage of time. However, these numerical examples can be any numbers. For example, as shown in FIG. 10, the period for transmitting the first system information (100%) may coincide with the period for changing the group to be barred (N=5).

Hereinabove, the base station and the system information notification method according to the present invention are explained by the embodiment. However, the present invention is not limited to the above-described embodiment, and various modifications and improvements may be made within the scope of the present invention. For example, the present invention may be applied to any suitable mobile communication system which attempts to bar a part of units of user equipment. For example, the present invention may be applied to a W-CDMA system, a HSDPA/HSUPA based W-CDMA system, an LTE system, an LTE-Advanced system, an IMT-Advanced system, a WiMAX system, a Wi-Fi system, and the like. Specific examples of numerical values are used in order to facilitate understanding of the invention. However, these numerical values are simply illustrative, and any other appropriate values may be used, except as indicated otherwise. Specific examples of the formulas are used in order to facilitate understanding of the invention. However, these formulas are simply illustrative, and any other appropriate formulas may be used, except as indicated otherwise. The separations of the embodiment or the items are not essential to the present invention. Depending on necessity, subject matter described in the embodiment and two or more items may be combined and used, and subject matter described in an item may be applied to subject matter described in another item (provided that they do not contradict). The boundary of the functional unit or the processing unit in the functional block diagram may not necessarily correspond to the boundary of a physical component. Operation of a plurality of functional units, may be physically executed by a single component, or operation of a single functional unit may be physically executed by a plurality of components. For the convenience of the explanation, the device according to the embodiment of the present invention is explained by using the functional block diagrams. However, these devices may be implemented in hardware, software, or combinations thereof. The software may be prepared in any appropriate storage medium, such as a random access memory (RAM), a flash memory, a read-only memory (ROM), an EPROM, an EEPROM, a register, a hard disk drive (HDD), a removable disk, a CD-ROM, a database, a server, and the like. The present invention is not limited to the above-described embodiment, and various variations, modifications, alterations, substitutions and so on are included, without departing from the spirit of the present invention.

The present application is based on and claims the benefit of priority of Japanese Patent Application No. 2011-176241, filed on Aug. 11, 2011, the entire contents of which are hereby incorporated by reference.

LIST OF REFERENCE SYMBOLS

21: Congestion measurement/detection unit
22: Parameter selection unit
23: System information creating unit
24: Paging signal generating unit
25: Transmission timing determination unit
25: Signal transmitter
eNB: LTE base station
NodeB: 3G base station
UE: User equipment

The invention claimed is:

1. A base station comprising:
a system information creating unit that creates first system information and second system information, wherein the first system information indicates that communication is barred, and the second system information indicates that the communication is not barred;
a timing determination unit that classifies units of user equipment into one or more of a plurality of groups based on timings of the units of the user equipment being in an idle mode to be activated in every discontinuous reception period, and that determines, for each of the plurality of groups, a transmission timing of transmitting a paging signal; and
a transmitter,
wherein, the transmitter transmits the paging signal to the units of the user equipment belonging to the one or more of the plurality of groups, and subsequently transmits the first system information; the transmitter switches from transmission of the first system information to transmission of the second system information, so that a ratio between a number of times of transmitting the first system information and a number of times of transmitting the second system information corresponds to a barring ratio, wherein the barring ratio is determined in accordance with a congestion level of a cell; and the transmitter transmits the paging signal to the units of the user equipment belonging to the one or more of the plurality of groups, and subsequently transmits the second system information.

2. The base station according to claim 1,
wherein the ratio between the number of times of transmitting the first system information and the number of times of transmitting the second system information is equal to the barring ratio, wherein the barring ratio is determined in accordance with the congestion level of the cell.

3. The base station according to claim 1,
wherein a number of the one or more of the plurality of groups is determined, so that a percentage of the number of the one or more of the plurality of groups with respect to a total number of the plurality of groups corresponds to the barring ratio.

4. The base station according to claim 1,
wherein the one or more groups are changed at every predetermined time interval.

5. A system information notification method of a base station, the method comprising steps of:
classifying units of user equipment into one or more of a plurality of groups based on timings of the units of the user equipment being in an idle mode to be activated in every discontinuous reception period, and determining, for each of the plurality of groups, a transmission timing of transmitting a paging signal;
transmitting the paging signal to the units of the user equipment belonging to the one or more of the plurality of groups, and subsequently transmitting first system information;
switching from transmission of the first system information to transmission of the second system information, so that a ratio between a number of times of transmitting the first system information and a number of times of transmitting the second system information corresponds to a barring ratio, wherein the first system information indicates that communication is barred, the second system information indicates that the communication is not barred, and the barring ratio is determined in accordance with a congestion level of a cell; and
transmitting the paging signal to the one or more of the plurality of groups, and subsequently transmitting the second system information.

\* \* \* \* \*